UNITED STATES PATENT OFFICE.

MERRIT H. RICE, OF NEW ROCHELLE, NEW YORK, ASSIGNOR TO NATIONAL ELECTRIC UTILITIES CORPORATION, OF NEW YORK, N. Y., A CORPORATION OF NEW YORK.

ELECTRICAL RESISTANCE ELEMENT AND PROCESS OF MAKING THE SAME.

1,232,843.     Specification of Letters Patent.     Patented July 10, 1917.

No Drawing.     Application filed April 8, 1913. Serial No. 759,784.

*To all whom it may concern:*

Be it known that I, MERRIT H. RICE, a citizen of the United States, residing at New Rochelle, in the county of Westchester and State of New York, have invented new and useful Improvements in Electrical Resistance Elements and Processes of Making the Same, of which the following is a specification.

This invention relates to electrical resistance elements and processes for making the same and has for its object the production of a composite electrical resistance element consisting of a base and an envelop or covering fused thereto or united therewith, preferably of a material or composition which is hard, melts only at high temperatures, cannot be easily broken, is a non-conductor of electricity, and adapted fully to protect the base against disintegration. The base of the electrical resistance element may be of any suitable material, such as, for example, carbon or a substance comprising carbon as a constituent. The coating or its ingredients may vary within considerable limits provided they are such as to fuse or unite with the base and thus afford a coating of the character described. The particular ingredients of the coating which are preferably used comprise a material, as, for example, graphite, a binder, as, for example, French clay, and an agent for their manipulation and application, as, for example, water or soluble glass. These or their equivalents are made to unite with the base, preferably in an oil flame, so as to form on the base the coating or envelop. The whole affords a composite electrical resistance element of great utility.

In order that the invention may more readily be practised, it is hereinafter described in greater detail using for purposes of illustration carbon as the base, graphite as the ingredient of the coating which may be referred to as the material, French clay as the ingredient of the coating which may be referred to as the binder, and soluble glass as the agent used in manipulating and applying these ingredients, and a furnace burning crude oil as the source of heat.

To form such a coating for an electrical resistance element, five parts of B graphite and two parts of French clay are mixed together with enough soluble glass to form a thick paste of about the consistency of molasses. A layer of this paste is spread upon the carbon and allowed to dry. The paste-covered carbon is then placed in a furnace preferably burning crude oil—and the oil flame preferably directed against the electrode for several hours. The result of this is that the coating becomes fused or united with and forms an integral covering for the carbon. The composite electrical resistance element thus formed is removed from the furnace, cooled, and is then ready for use. The coating made of the ingredients specified and thus fused or united with the electrical resistance element proper is extremely hard, a non-conductor of electricity, melts only at extremely high temperatures, and can not be easily broken. Such a composite electrical resistance element is of great utility because the base is shielded from contact with the air and protected against disintegration by a lasting, fireproof, electrical-insulating covering.

Graphite, being not easily fusible, and French clay, being capable of resisting very high temperatures, are the best ingredients for such a coating so far as I have discovered, but other ingredients adapted to form an integral covering of a similar character may be used. When water glass is used as the agent for manipulating the clay and graphite, the following proportions produce the best results, to wit, one part of soluble glass or fluor-spar, two parts of French clay and five parts of B graphite. However, these proportions need not be strictly adhered to because they may be varied without losing all the advantages of the invention. The use of a furnace burning crude oil is desirable because the petroleum flame operates to give the desired character to the coating or envelop, by deposit or otherwise, more effectually than any other source of heat with which I am familiar.

Analyses of the coating of composite electrodes made in accordance with my process as described indicate that the coating contains a double silicate of aluminum and soda. I have been unable to determine whether or not the coating also contains crystallized carbon, but I believe this to be the case.

The composite electrical resistance element of my invention may be used in all kinds of electric heating and cooking apparatus. In actual practice I have found it particularly useful in electric ranges.

What I claim is:—

1. An electrical resistance element comprising a carbon base having a fused-on integral protective coating consisting of a double silicate of alumina and soda.

2. The process of manufacturing electrical resistance elements, comprising coating a carbon base with a coating containing graphite and clay, and fusing said coating to said base.

3. The process of manufacturing electrical resistance elements, comprising coating a base with a mixture of graphite, clay and water-glass, and fusing said coating to said base.

4. The process of manufacturing electrical resistance elements, comprising coating a carbon base with a mixture of graphite, clay and water-glass in about the following proportions: one part water-glass, two parts French clay, five parts graphite, and fusing said coating to said base.

5. The process of manufacturing electrical resistance elements comprising coating a base with a composition containing graphite, clay and water glass in about the following proportions:—1 part water glass, 2 parts clay and 5 parts graphite, subjecting the same to heat to fuse the composition to the base, and cooling the resultant product.

6. The process of manufacturing electrical resistance elements comprising coating a base with a composition which will fuse thereto when heated, subjecting the coated base to direct action of a flame from an oil furnace to form a composite resistance element consisting of a base and integral coating, and cooling the composite product thus formed.

7. The process of manufacturing electrical resistance elements comprising coating a base with a composition containing graphite and clay, subjecting the coated base to direct action of a flame from an oil furnace to form a composite resistance element consisting of the base and integral coating, and cooling the product thus formed.

8. The process of manufacturing electrical resistance elements comprising coating a base with a coating material and a binder, subjecting the coated base to direct action of a flame from an oil furnace to form a composite resistance element consisting of the base and integral coating, and cooling the product thus formed.

9. The process of manufacturing electrical resistance elements comprising coating a base with a composition containing graphite, clay and soluble glass, subjecting the coated base to direct action of a flame from an oil furnace to form a composite resistance element consisting of the base and integral coating, and cooling the product thus formed.

In testimony whereof, I have hereunto set my hand in the presence of witnesses.

MERRIT H. RICE.

Witnesses:
E. C. VAN GLAHN,
ALEX T. GRÜNBERG.